United States Patent
Shieh et al.

(10) Patent No.: US 7,633,976 B2
(45) Date of Patent: *Dec. 15, 2009

(54) METHOD AND APPARATUS FOR CODE GROUP IDENTIFICATION AND FRAME SYNCHRONIZATION BY USE OF REED-SOLOMON DECODER AND RELIABILITY MEASUREMENT FOR UMTS W-CDMA

(75) Inventors: Shin-Lin Shieh, Chin-Men Hsien (TW); Shin-Yuan Wang, Hsinchu (TW); Hui-Ming Wang, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 1733 days.

This patent is subject to a terminal disclaimer.

(21) Appl. No.: 10/316,319

(22) Filed: Dec. 10, 2002

(65) Prior Publication Data

US 2004/0057468 A1    Mar. 25, 2004

Related U.S. Application Data

(60) Provisional application No. 60/412,532, filed on Sep. 19, 2002.

(51) Int. Cl.
*H04L 7/00* (2006.01)
*H04B 1/66* (2006.01)
*H04J 3/06* (2006.01)
*H04J 13/00* (2006.01)

(52) U.S. Cl. .............. 370/513; 370/350; 370/479; 375/365; 375/240.28

(58) Field of Classification Search ............. 370/335, 370/329, 350, 503, 507, 508, 509, 510, 512; 375/149, 147, 148, 150, 151, 130, 142, 145
See application file for complete search history.

(56) References Cited

U.S. PATENT DOCUMENTS

| | | | |
|---|---|---|---|
| 6,185,244 B1 * | 2/2001 | Nystrom et al. | 375/145 |
| 6,775,318 B2 * | 8/2004 | Chen et al. | 375/149 |
| 6,990,091 B2 * | 1/2006 | Sarkar | 370/342 |
| 7,126,981 B2 * | 10/2006 | Ho et al. | 375/147 |

* cited by examiner

*Primary Examiner*—Hanh Nguyen (57) ABSTRACT

A method and apparatus having a modified Reed-Solomon decoder is used for finding a specific code group used by a base station and the frame timing synchronization with the base station. The modified Reed-Solomon decoder uses a standard Reed-Solomon decoder and some reliability measurements computed from the received code word symbols. If the reliability of a received symbol is too low, this symbol is considered as erasure. By selecting code word symbols with higher reliabilities and erasing code word symbols with lower reliabilities, the symbol error probability is reduced and the performance is improved. Several modified Reed-Solomon decoders and a few decoding strategies are introduced in order to decode the received code word sequences with a power- and memory-effective method.

13 Claims, 9 Drawing Sheets

| Scrambling Code Group | slot number |||||||||||||||
|---|---|---|---|---|---|---|---|---|---|---|---|---|---|---|---|
| | #0 | #1 | #2 | #3 | #4 | #5 | #6 | #7 | #8 | #9 | #10 | #11 | #12 | #13 | #14 |
| Group 0 | 1 | 1 | 2 | 8 | 9 | 10 | 15 | 8 | 10 | 16 | 2 | 7 | 15 | 7 | 16 |
| Group 1 | 1 | 1 | 5 | 16 | 7 | 3 | 14 | 16 | 3 | 10 | 5 | 12 | 14 | 12 | 10 |
| Group 2 | 1 | 2 | 1 | 15 | 5 | 5 | 12 | 16 | 6 | 11 | 2 | 16 | 11 | 15 | 12 |
| Group 3 | 1 | 2 | 3 | 1 | 8 | 6 | 5 | 2 | 5 | 8 | 4 | 4 | 6 | 3 | 7 |
| Group 4 | 1 | 2 | 16 | 6 | 6 | 11 | 15 | 5 | 12 | 1 | 15 | 12 | 16 | 11 | 2 |
| Group 5 | 1 | 3 | 4 | 7 | 4 | 1 | 5 | 5 | 3 | 6 | 2 | 8 | 7 | 6 | 8 |
| Group 6 | 1 | 4 | 11 | 3 | 4 | 10 | 9 | 2 | 11 | 2 | 10 | 12 | 12 | 9 | 3 |
| Group 7 | 1 | 5 | 6 | 6 | 14 | 9 | 10 | 2 | 13 | 9 | 2 | 5 | 14 | 1 | 13 |
| Group 8 | 1 | 6 | 10 | 10 | 4 | 11 | 7 | 13 | 16 | 11 | 13 | 6 | 4 | 1 | 16 |
| Group 9 | 1 | 6 | 13 | 2 | 14 | 2 | 6 | 5 | 5 | 13 | 10 | 9 | 1 | 14 | 10 |
| Group 10 | 1 | 7 | 8 | 5 | 7 | 2 | 4 | 3 | 8 | 3 | 2 | 6 | 6 | 4 | 5 |
| Group 11 | 1 | 7 | 10 | 9 | 16 | 7 | 9 | 15 | 1 | 8 | 16 | 8 | 15 | 2 | 2 |
| Group 12 | 1 | 8 | 12 | 9 | 9 | 4 | 13 | 16 | 5 | 1 | 13 | 5 | 12 | 4 | 8 |
| Group 13 | 1 | 8 | 14 | 10 | 14 | 1 | 15 | 15 | 8 | 5 | 11 | 4 | 10 | 5 | 4 |
| Group 14 | 1 | 9 | 2 | 15 | 15 | 16 | 10 | 7 | 8 | 1 | 10 | 8 | 2 | 16 | 9 |
| Group 15 | 1 | 9 | 15 | 6 | 16 | 2 | 13 | 14 | 10 | 11 | 7 | 4 | 5 | 12 | 3 |
| Group 16 | 1 | 10 | 9 | 11 | 15 | 7 | 6 | 4 | 16 | 5 | 2 | 12 | 13 | 3 | 14 |
| Group 17 | 1 | 11 | 14 | 4 | 13 | 2 | 9 | 10 | 12 | 16 | 8 | 5 | 3 | 15 | 6 |
| Group 18 | 1 | 12 | 12 | 13 | 14 | 7 | 2 | 8 | 14 | 2 | 1 | 13 | 11 | 8 | 11 |
| Group 19 | 1 | 12 | 15 | 5 | 4 | 14 | 3 | 16 | 7 | 8 | 6 | 2 | 10 | 11 | 13 |
| Group 20 | 1 | 15 | 4 | 3 | 7 | 6 | 10 | 13 | 12 | 5 | 14 | 16 | 8 | 2 | 11 |
| Group 21 | 1 | 16 | 3 | 12 | 11 | 9 | 13 | 5 | 8 | 2 | 14 | 7 | 4 | 10 | 15 |
| Group 22 | 2 | 2 | 5 | 10 | 16 | 11 | 3 | 10 | 11 | 8 | 5 | 13 | 3 | 13 | 8 |
| Group 23 | 2 | 2 | 12 | 3 | 15 | 5 | 8 | 3 | 5 | 14 | 12 | 9 | 8 | 9 | 14 |
| Group 24 | 2 | 3 | 6 | 16 | 12 | 16 | 3 | 13 | 13 | 6 | 7 | 9 | 2 | 12 | 7 |
| Group 25 | 2 | 3 | 8 | 2 | 9 | 15 | 14 | 3 | 14 | 9 | 5 | 5 | 15 | 8 | 12 |
| Group 26 | 2 | 4 | 7 | 9 | 5 | 4 | 9 | 11 | 2 | 14 | 5 | 14 | 11 | 16 | 16 |
| Group 27 | 2 | 4 | 13 | 12 | 12 | 7 | 15 | 10 | 5 | 2 | 15 | 5 | 13 | 7 | 4 |
| Group 28 | 2 | 5 | 9 | 9 | 3 | 12 | 8 | 14 | 15 | 12 | 14 | 5 | 3 | 2 | 15 |
| Group 29 | 2 | 5 | 11 | 7 | 2 | 11 | 9 | 4 | 16 | 7 | 16 | 9 | 14 | 14 | 4 |
| Group 30 | 2 | 6 | 2 | 13 | 3 | 3 | 12 | 9 | 7 | 16 | 6 | 9 | 16 | 13 | 12 |
| Group 31 | 2 | 6 | 9 | 7 | 7 | 16 | 13 | 3 | 12 | 2 | 13 | 12 | 9 | 16 | 6 |
| Group 32 | 2 | 7 | 12 | 15 | 2 | 12 | 4 | 10 | 13 | 15 | 13 | 4 | 5 | 5 | 10 |
| Group 33 | 2 | 7 | 14 | 16 | 5 | 9 | 2 | 9 | 16 | 11 | 11 | 5 | 7 | 4 | 14 |
| Group 34 | 2 | 8 | 5 | 12 | 5 | 2 | 14 | 14 | 8 | 15 | 3 | 9 | 12 | 15 | 9 |
| Group 35 | 2 | 9 | 13 | 4 | 2 | 13 | 8 | 11 | 6 | 4 | 6 | 8 | 15 | 15 | 11 |
| Group 36 | 2 | 10 | 3 | 2 | 13 | 16 | 8 | 10 | 8 | 13 | 11 | 11 | 16 | 3 | 5 |
| Group 37 | 2 | 11 | 15 | 3 | 11 | 6 | 14 | 10 | 15 | 10 | 6 | 7 | 7 | 14 | 3 |
| Group 38 | 2 | 16 | 4 | 5 | 16 | 14 | 7 | 11 | 4 | 11 | 14 | 9 | 9 | 7 | 5 |
| Group 39 | 3 | 3 | 4 | 6 | 11 | 12 | 13 | 6 | 12 | 14 | 4 | 5 | 13 | 5 | 14 |
| Group 40 | 3 | 3 | 6 | 5 | 16 | 9 | 15 | 5 | 9 | 10 | 6 | 4 | 15 | 4 | 10 |
| Group 41 | 3 | 4 | 5 | 14 | 4 | 6 | 12 | 13 | 5 | 13 | 6 | 11 | 11 | 12 | 14 |
| Group 42 | 3 | 4 | 9 | 16 | 10 | 4 | 16 | 15 | 3 | 5 | 10 | 5 | 15 | 6 | 6 |
| Group 43 | 3 | 4 | 16 | 10 | 5 | 10 | 4 | 9 | 9 | 16 | 15 | 6 | 3 | 5 | 15 |
| Group 44 | 3 | 5 | 12 | 11 | 14 | 5 | 11 | 13 | 3 | 6 | 14 | 6 | 13 | 4 | 4 |
| Group 45 | 3 | 6 | 4 | 10 | 6 | 5 | 9 | 15 | 4 | 15 | 5 | 16 | 16 | 9 | 10 |
| Group 46 | 3 | 7 | 8 | 8 | 16 | 11 | 12 | 4 | 15 | 11 | 4 | 7 | 16 | 3 | 15 |
| Group 47 | 3 | 7 | 16 | 11 | 4 | 15 | 3 | 15 | 11 | 12 | 12 | 4 | 7 | 8 | 16 |
| Group 48 | 3 | 8 | 7 | 15 | 4 | 8 | 15 | 12 | 3 | 16 | 4 | 16 | 12 | 11 | 11 |
| Group 49 | 3 | 8 | 15 | 4 | 16 | 4 | 8 | 7 | 7 | 15 | 12 | 11 | 3 | 16 | 12 |
| Group 50 | 3 | 10 | 10 | 15 | 16 | 5 | 4 | 6 | 16 | 4 | 3 | 15 | 9 | 6 | 9 |
| Group 51 | 3 | 13 | 11 | 5 | 4 | 12 | 4 | 11 | 6 | 6 | 5 | 3 | 14 | 13 | 12 |
| Group 52 | 3 | 14 | 7 | 9 | 14 | 10 | 13 | 8 | 7 | 8 | 10 | 4 | 4 | 13 | 9 |
| Group 53 | 5 | 5 | 8 | 14 | 16 | 13 | 6 | 14 | 13 | 7 | 8 | 15 | 6 | 15 | 7 |
| Group 54 | 5 | 6 | 11 | 7 | 10 | 8 | 5 | 8 | 7 | 12 | 12 | 10 | 6 | 9 | 11 |
| Group 55 | 5 | 6 | 13 | 8 | 13 | 5 | 7 | 7 | 6 | 16 | 14 | 15 | 8 | 16 | 15 |
| Group 56 | 5 | 7 | 9 | 10 | 7 | 11 | 6 | 12 | 9 | 12 | 11 | 8 | 8 | 6 | 10 |
| Group 57 | 5 | 9 | 6 | 8 | 10 | 9 | 8 | 12 | 5 | 11 | 10 | 11 | 12 | 7 | 7 |
| Group 58 | 5 | 10 | 10 | 12 | 8 | 11 | 9 | 7 | 8 | 9 | 5 | 12 | 6 | 7 | 6 |
| Group 59 | 5 | 10 | 12 | 6 | 5 | 12 | 8 | 9 | 7 | 6 | 7 | 8 | 11 | 11 | 9 |
| Group 60 | 5 | 13 | 15 | 15 | 14 | 8 | 6 | 7 | 16 | 8 | 7 | 13 | 14 | 5 | 16 |
| Group 61 | 9 | 10 | 13 | 10 | 11 | 15 | 15 | 9 | 16 | 12 | 14 | 13 | 16 | 14 | 11 |
| Group 62 | 9 | 11 | 12 | 15 | 12 | 9 | 13 | 13 | 11 | 14 | 10 | 16 | 15 | 14 | 16 |
| Group 63 | 9 | 12 | 10 | 15 | 13 | 14 | 9 | 14 | 15 | 11 | 11 | 13 | 12 | 16 | 10 |

FIG. 9 (Table 1)

US 7,633,976 B2

METHOD AND APPARATUS FOR CODE GROUP IDENTIFICATION AND FRAME SYNCHRONIZATION BY USE OF REED-SOLOMON DECODER AND RELIABILITY MEASUREMENT FOR UMTS W-CDMA

CROSS-REFERENCES TO RELATED APPLICATIONS

This is a non-provisional application of U.S. Provisional Application No. 60/412,532, filed Sep. 19, 2002, which is incorporated herewith by reference.

FIELD OF THE INVENTION

The present invention generally relates to an apparatus and method for code group identification and frame synchronization used in direct-sequence code division multiple access (DS-CDMA) communication systems, such as wide-band CDMA systems and 3rd generation partnership project (3GPP) system.

BACKGROUND OF THE INVENTION

Currently, DS-CDMA cellular systems are classified as inter-cell synchronous systems with precise inter-cell synchronization and asynchronous systems without it. For inter-cell synchronous systems, an identical long code is assigned to each base station, but with a different time offset. The initial cell search can be executed by performing timing acquisition of the long code. The search for a peripheral cell on hand-over can be carried out quickly because the mobile station can receive the offset information of the long code for the peripheral base station from the current base station. Therefore, each base station requires a precise-time synchronization apparatus, such as the global position system (GPS) and rubidium backup oscillators. However, it is difficult to deploy GPS in basements or other locations where RF signals cannot easily reach.

In asynchronous systems such as wide-band CDMA and 3GPP, each base station adopts two synchronization channels such that a mobile terminal can establish the link and will not lose the connection on hand-offs by acquiring the synchronization codes transmitted in synchronization channels. The first synchronization channel (primary synchronization channel, hereinafter PSCH) consists of an unmodulated primary synchronization code (denoted as $C_{psc}$) with length of 256 chips transmitted once every slot. $C_{psc}$ is the same for all base stations. This code is periodically transmitted such that it is time-aligned with the slot boundary of downlinik channels. The secondary synchronization channel (hereinafter SSCH) consists of a sequence of 15 unmodulated secondary synchronization codes ($C_{ssc}^{i,0}$ to $C_{ssc}^{i,14}$) repeatedly transmitted in parallel with $C_{psc}$ in the PSCH. The 15 secondary synchronization codes are sequentially transmitted once every frame. Each secondary synchronization code is chosen from a set of 16 different orthogonal codes of length 256 chips. This sequence on the SSCH corresponds to one of the 64 different code groups which the base station downlinik scrambling code belongs to. The code allocation for a base station is shown in Table 1 as illustrated in FIG. 9. These 64 sequences are constructed such that their cyclic-shifts are unique. In other words, if the count of cyclic-shifting is 0 to 14, all 960 (=64*15) possible sequences generated by cyclic-shifting the 64 sequences are different from each other. Base upon this property, cell search algorithms can be developed to uniquely determine both the code group and the frame timing.

During the initial cell search for the wide-band CDMA system proposed by 3GPP, a mobile station searches for the base station to which it has a lowest path loss. It then determines the downlinik scrambling code and frame synchronization of the base station. As is well known in digital communication, a stream of framed data is transmitted and frame synchronization is the important process by which incoming frame signals of a stream of framed data are identified so that the data bits within the frame can be extracted for decoding or retransmission. This initial cell search is typically carried out in three steps:

Step 1: Slot Synchronization

During the first step of the initial cell search procedure, the mobile station searches for the base station to which it has lowest path loss via the primary synchronization code transmitted on the PSCH. This is typically done with a single matched filter matching to the primary synchronization code. Since the primary synchronization code is common to all the base stations, the power of the output signal of the matched filter should have peaks for each ray from each base station within a receivable range. The strongest peak corresponds to the most stable base station for linking. Detecting the position of the strongest peak yields the timing and the slot length that the strongest base station modulates. That is, this procedure allows the mobile station to acquire slot synchronization to the strongest base station.

Step 2: Frame Synchronization and Code-Group Identification

During the second step of the cell search procedure, the mobile station utilizes the secondary synchronization code in the SSCH to find the frame synchronization and the code group of the cell found in the first step. Since the secondary synchronization code is transmitted in parallel with the primary synchronization code, the slot timing of the secondary synchronization channel can also be found during the first step. The received signal at each time slot of the secondary synchronization channel is consequently correlated with 16 possible secondary synchronization code word symbol signals for code word symbol identification for code identification. The 15 consecutive code word symbols received and identified within one frame construct a received sequence. By sending the received sequence into a Reed-Solomon Decoder or by correlating the received sequence with the 960 possible sequences, the code group for the synchronized base station as well as the frame synchronization can be determined.

Step 3: Scrambling-Code Identification

During the last step of the cell search procedure, the mobile terminal determines the exact primary scrambling code used by the found base station. The primary scrambling code is typically identified through symbol-to-symbol correlation over the Common Pilot Channel (hereinafter CPICH) with all codes within the code group identified in the second step. After the identification of the primary scrambling code, the Primary Common Control Physical Channel (hereinafter PCCPCH) can be detected. Then the system- and cell-specific information can be read.

In summary, the main tasks of the initial cell search procedure are to (1) search for a cell with the strongest received power, (2) determine frame synchronization and code group, and (3) determine the down-link primary scrambling code.

The cell search procedure (2) is the subject of this invention. The SSCH is used to determine frame synchronization. A frame of 15 SSCH symbols forms a code word sequence taken from a codebook of 64 different code word sequences. The same code word sequence is repeated every frame in a cell. The 64 code word sequences are chosen to have distinct code phase shifts, and any phase shift of a code word sequence is different from all phase shifts of all other code word sequences. With these properties, the frame boundary can be detected by identifying the correct starting phase of the SSCH symbol sequence. In order to satisfy the above properties and maximize the minimum distance between different code word sequences, a (15,3) Comma-Free Reed-Solomon Code over GF(16) is proposed.

The standard Reed-Solomon decoder for (15,3) Comma-Free Reed-Solomon can be found in textbooks about error correcting codes and can correct up to 6 symbol errors. However, due to the frequency error, channel fading, channel noise or other reasons, the number of symbol errors may exceed 6 frequently. Therefore, the standard Reed-Solomon decoder fails to return a valid code word.

Another method is proposed by Yi-Ping Eric Wang in "IEEE Journal on Selected Areas in Communications vol. 18, no. 8 August 2000". Wang proposed that after achieving slot synchronization, the receiver operations start with correlating the received signal of SCH with all 16 S-SCH sequences, and then accumulates SSCH correlations over $N_t$ slots according to the 64 Reed-Solomon code word sequences used, each with 15 hypothesized frame boundaries. The total number of hypotheses is therefore 960. At the end, the hypothesis with the largest accumulated metric is chosen as the candidate for frame boundary-code group pair, which is given to next stage for scrambling code identification.

The method proposed by Wang has better performance, but it needs large amount of memory and large amount of computation work. In our invention, we provide a power- and memory-effective method by use of standard Reed-Solomon decoder combined with reliability measurement.

SUMMARY OF THE INVENTION

The present invention has been made to overcome the above-mentioned drawback of conventional frame synchronization and code group identification. An object of the present invention is to provide a power- and memory-effective method and apparatus for frame synchronization and code group identification. Accordingly, the apparatus of this invention comprises a correlator bank having a plurality of correlators, a hard decision and reliability measurement unit, a code sequence identifier, a frame boundary finder and a code group identification unit.

When each signal is received, the signal is sent to the correlator bank to identify the correlation between the current received signal and 16 orthogonal code word symbols. The hard decision and reliability measurement unit then chooses the hard decision symbol with the highest correlation, and the reliability is computed as a function of 16 correlations.

It is also an object of the invention to provide a modified Reed-Solomon decoder in the code sequence identifier to decode the code word sequence. In a preferred embodiment, the modified Reed-Solomon decoder uses a threshold to determine if a code word symbol should be erased or not based on the reliability of the hard decision symbol. When the number of valid symbols exceeds or equals to a threshold which is between 3 and 15, the whole code sequence is sent to a standard Reed-Solomon error and erasure decoder for decoding.

In another embodiment, the modified Reed-Solomon decoder compares the number of erasures in a code word sequence with a threshold which is an integer between 0 and 12. If the number of erasures is not larger than a threshold, the code sequence is sent to a standard Reed-Solomon error and erasure decoder. If the decoder does not return a valid code, k additional code word symbols with lowest reliabilities are erased and the new code sequence is sent to the standard Reed-Solomon error and erasure decoder again.

It is yet another object of the invention to further reduce the symbol error probability and improve the performance of the code sequence identifier by using more than one frame of code word symbols. Accordingly, a symbol and reliability update unit is added in the code sequence identifier. Because the code word symbols are transmitted cyclically, after a frame of code words is received and recorded, the next code word symbol ideally is identical to the first code word symbol in the recorded frame. The next code word symbol and its reliability are used to update the corresponding code word symbol in the recorded frame. When more than one frame of symbols are received, a decoding strategy is to update the hard decision symbols with the additional symbols according to their reliabilities. The updated code sequence is then decoded by the modified Reed-Solomon decoder.

Another decoding strategy for using more than one code word sequence is to first receive two code word sequences and then generate a new code word sequence by comparing the two code word sequences. A code word symbol is erased if the corresponding code word symbols in the two received sequences are not identical. The new code word sequence is then sent to a standard Reed-Solomon error and erasure decoder.

An alternative decoding strategy includes using hard decision on multiple frames of code word symbols with voting. A number of code word sequences are received and their hard-decision symbol values are recorded. A new code word sequence is generated by taking the majority vote of the corresponding code word symbols in the multiple frames. The new code word sequence is then sent to a standard Reed-Solomon error and erasure decoder.

It is a further object of the invention to provide a method of frame synchronization. By observing the 64 code word sequences in Table 1, the present invention found that the first code word symbol in a frame must have a smallest symbol value. If the smallest symbol value is unique, this symbol is the head of the frame. If the smallest symbol value is found twice, then the neighboring symbol after the head of the frame must have a smaller value than the neighboring symbol after the smallest symbol found in the other slot.

It is yet another object to provide a memory efficient method for identifying the code group of the code word sequence. The 64 code word groups that are valid code words of comma-free Reed-Solomon codes also have the feature that the code word sequence in each group can be uniquely identified by the first three code word symbols. By storing the first three code word symbols of each code word group in the 64 code word groups, the code number of a received code word sequence can be identified.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein:

FIG. 9 illustrates the table of 64 groups of valid code words of comma-free Reed-Solomon codes.

DETAILED DESCRIPTION OF THE PREFERRED EMBODIMENTS

Figure 1:
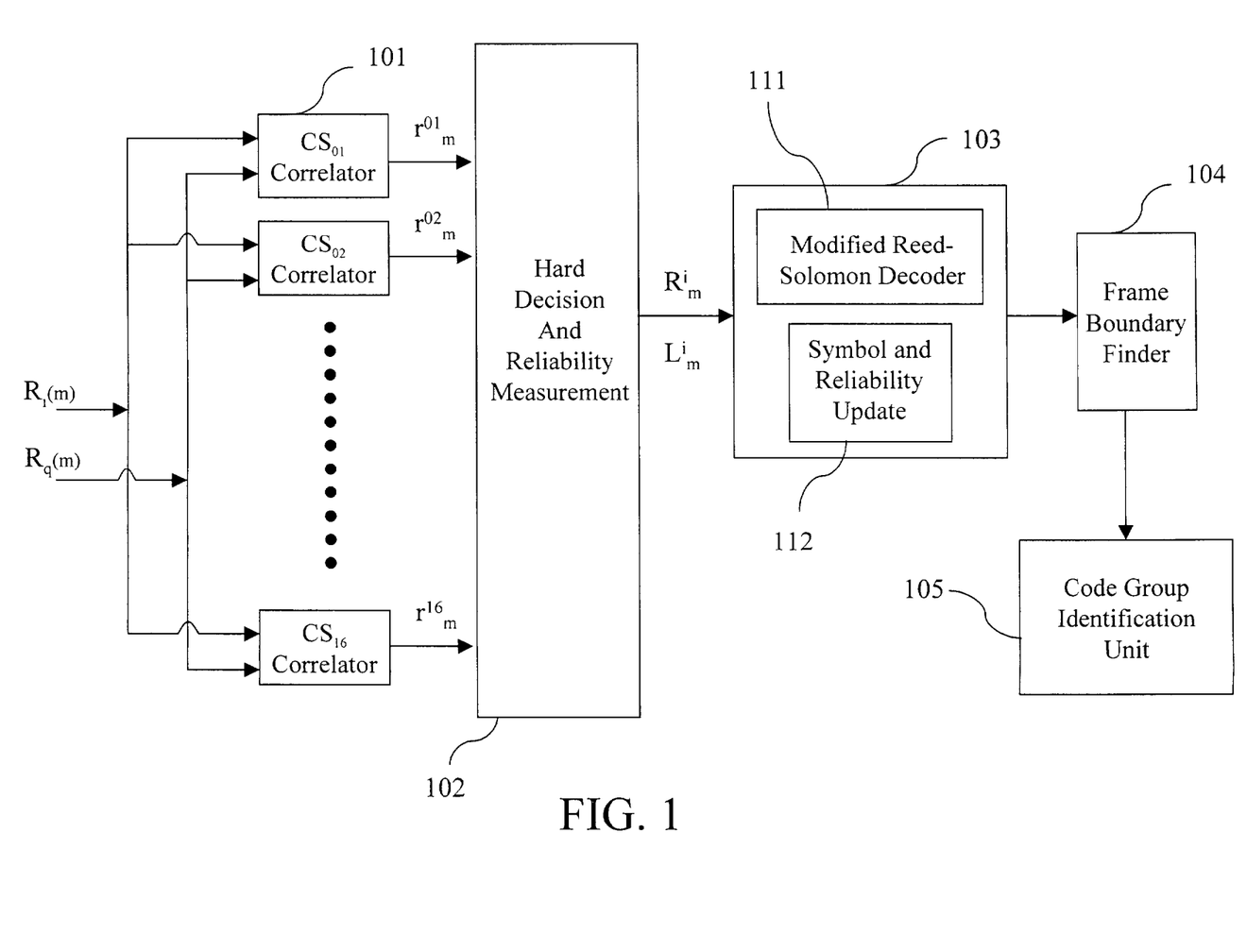
FIG. 1 illustrates the block diagram of the apparatus for code group identification and frame synchronization according to the invention.

The gist of the present invention is using a standard Reed-Solomon error-and-erasure decoder combined with reliability measurement for code group identification and frame synchronization in UMTS WCDMA systems. FIG. 1 shows a block diagram of the apparatus for frame synchronization and code group identification of this invention. The apparatus comprises a correlator bank having a plurality of correlators 101, a hard decision and reliability measurement unit 102, a code sequence identifier 103, a frame boundary finder 104 and a code group identification unit 105.

It is known that each one of the 64 code groups of secondary synchronization code corresponds to a valid code word from (15,3) Reed-Solomon code. In general, after 16 Walsh code correlators, the hard-decision symbol error rate is too high that in most cases the standard Reed-Solomon decoder fails to return a valid code word. However, using a Reed-Solomon decoder has many advantages such as less memory requirement and low computation complexity.

According to this invention, when a signal is received, it is sent to the correlator bank comprising 16 correlators 101 to identify the correlation between the current received signal with the 16 orthogonal code word symbols $CS_{01}, CS_{02}, \ldots,$ and $CS_{16}$. The output correlation values from the 16 correlators at time m are $\{r^{01}_m, r^{02}_m, \ldots, r^{16}_m\}$. The hard decision symbol value $R_m$ at time m is chosen from $\{CS_{10}, CS_{02}, \ldots, CS_{16}\}$ with the highest correlation. The reliability measurement is defined as a function of the 16 correlation values $\{r^{01}_m, r^{02}_m, \ldots, r^{16}_m\}$, which is used to measure how reliable the hard decision symbol value $R_m$ is. For example, reliability measurement $L_m$ can be defined as $$L_m = \max(r^{01}_m, r^{02}_m, \ldots, r^{16}_m).$$

or $$L_m = \frac{\max(r^{01}_m, r^{02}_m, \ldots, r^{16}_m)}{\sum_{j=1}^{16} |r^j_m|}.$$

As shown in FIG. 1, the hard decision and reliability measurement unit 102 receives the correlation values from the plurality of correlators 101 to choose a symbol $R_m$ by making a hard decision. A reliability measurement $L_m$ for the chosen symbol is then calculated according to a pre-determined formula shown above.

Since each one of the 64 code groups is a valid code word from (15,3) Reed-Solomon codes, the minimum number of code word symbols required is 3 for the Reed-Solomon decoder to return a valid code. When all code word symbols are received, this invention selects code word symbols with higher reliability measurements and erase others. Based on the property of (15,3) Reed-Solomon codes, at most 12 code word symbols with low reliability can be erased if all 15 code word symbols are received.

According to the present invention, the code sequence identifier 103 comprises a modified Reed-Solomon decoder 111. A preferred embodiment of the modified Reed-Solomon decoder 111 is a "threshold-erase decoder" in which a threshold $\sigma_r$ is used to determine if a code word symbol should be erased based on the reliability measurement calculated in the hard decision and reliability measurement unit 102.

Figure 2:
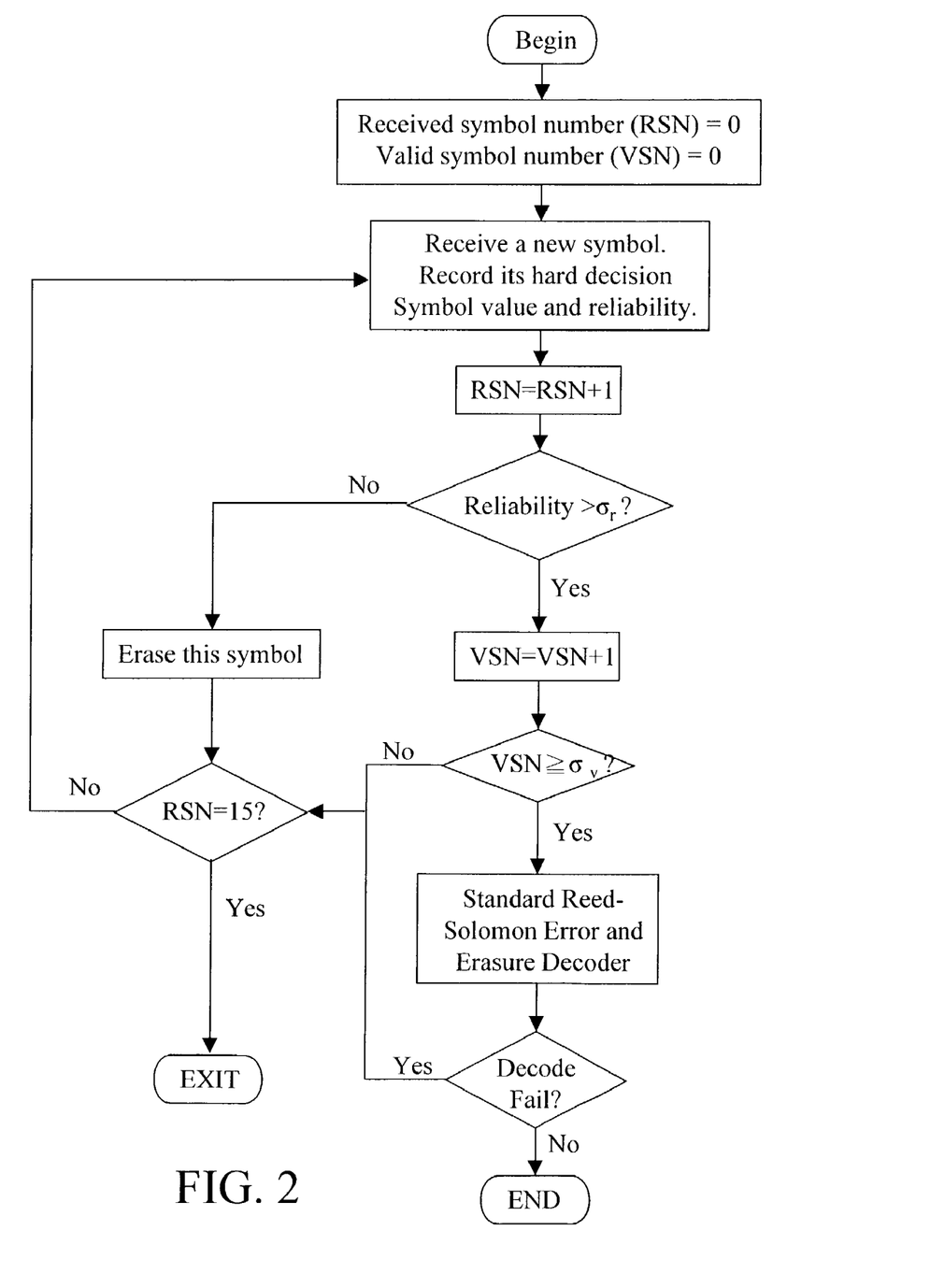
FIG. 2 illustrates the flow chart of an embodiment of modified Reed-Solomon Decoder—"Threshold-Erase Decoder"

FIG. 2 shows a flow chart of the method of implementing the threshold-erase decoder for the modified Reed-Solomon decoder 111. When a new code word symbol is received, its hard decision symbol value and corresponding reliability are recorded. If the reliability is less than the threshold $\sigma_r$, the received code word symbol is considered an invalid symbol, an erasure is declared, and the corresponding reliability is set to be $-\infty$. If the reliability is larger than $\sigma_r$, the hard decision symbol value is recorded and the number of valid symbol (VSN) is increased by 1.

When the number of valid symbols is larger than or equal to a threshold $\sigma_v$, which is an integer between 3 and 15 and is a function of the received symbol number (RSN), the whole code sequence is sent to the standard Reed-Solomon error-and-erasure decoder. If the decoding process fails and the RSN is less than 15, another new code word symbol is received. If the reliability of the new symbol is larger than $\sigma_r$, the new code sequence (with a new received code word symbol) is sent to a standard Reed-Solomon error and erasure decoder again. The whole decoding process ends when the standard Reed-Solomon decoder returns a valid code word or exits when all 15 code word symbols are received.

Figure 3:
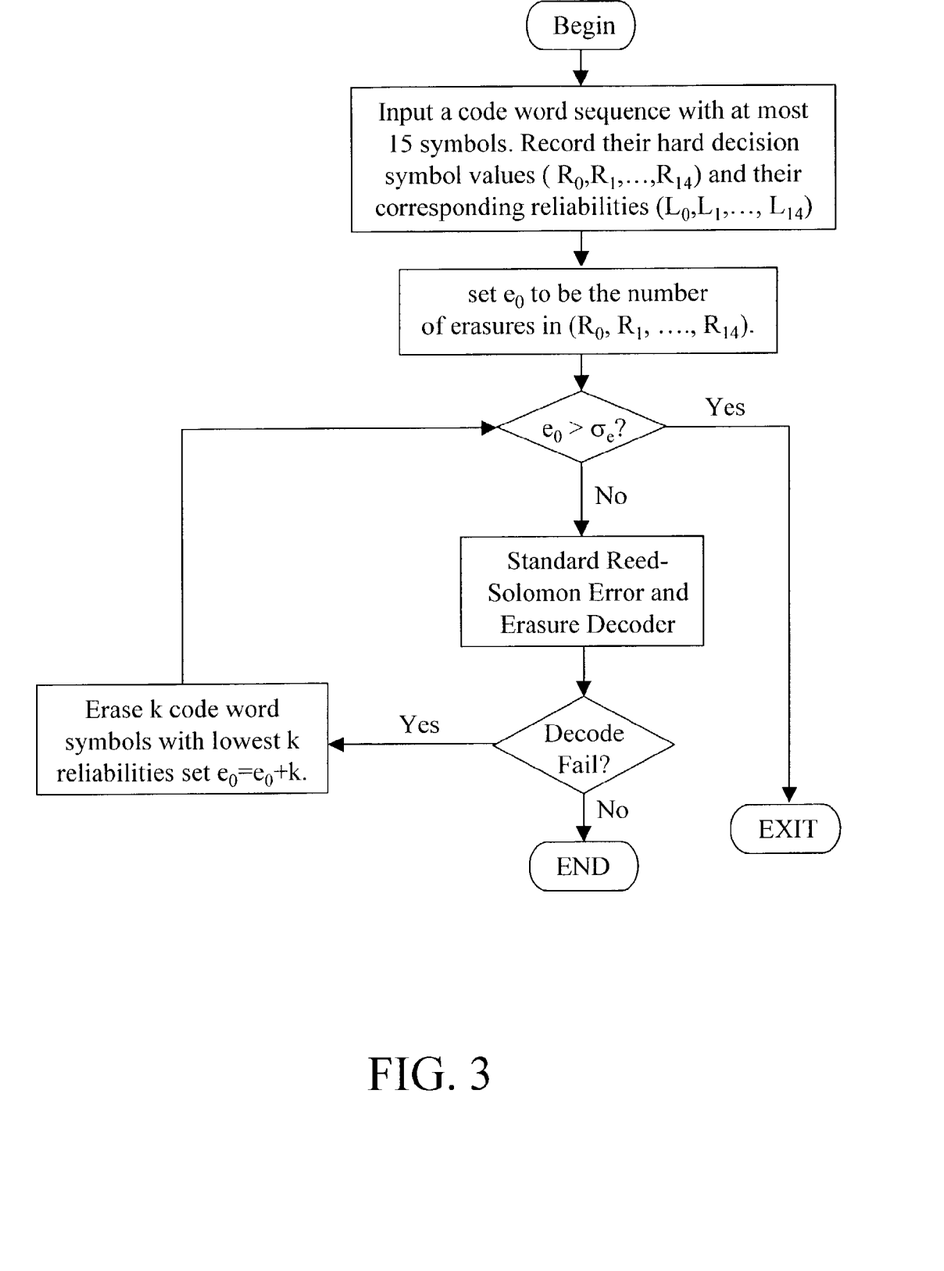
FIG. 3 illustrates the flow chart of an alternative embodiment of modified Reed-Solomon Decoder—"Erase k by k Decoder"

FIG. 3 shows another preferred embodiment for the modified Reed-Solomon decoder 111 which is named "erase k by k decoder". A code sequence with 15 code symbols is sent into the "erase k by k decoder". The hard-decision symbol values $(R_0, R_1, R_2, \ldots, R_{14})$ and their corresponding reliabilities $(L_0, L_1, L_2, \ldots, L_{14})$ are recorded. It should be noted that some of the code symbols may not be received or may be erased invalid symbols and, therefore, they are viewed as erasures and their reliabilities are set to be $-\infty$.

The total number of erasures $e_0$ is determined and compared with a threshold $\sigma_e$, which is an integer between 0 and 12. If the number of erasures $e_0$ is not larger than $\sigma_e$, the code sequence is sent to the standard Reed-Solomon error and erasure decoder. If the decoding process fails, $(L_0, L_1, L_2, \ldots, L_{14})$ is first sorted in an ascending order $(L_{(0)}, L_{(1)}, L_{(2)}, \ldots, L_{(14)})$, wherein $L_{(1)}$ corresponds to $R_{(1)}$. At this moment, there are $e_0$ erasures and, thus, $R_{(0)}, R_{(1)}, \ldots, R_{(e0-1)}$ are erasures and $L_{(0)}=L_{(1)}=\ldots=L_{(e0-1)}=-\infty$. In $L_{(e0)}, L_{(e0+1)}, \ldots, L_{(14)}$, the lowest k reliabilities (corresponding to symbols which are not erasures) are $L_{(e0)}, L_{(e0+1)}, \ldots, L_{(e0+k-1)}$.

The k code word symbols $R_{(e0)}, R_{(e0+1)}, \ldots, R_{(e0+k-1)}$ with corresponding reliabilities $L_{(e0)}, L_{(e0+1)}, \ldots, L_{(e0+k-1)}$ are then erased, wherein k is a positive integer and is a function of current $e_0$, i.e., it can be changed in each erase process. The number of erasure becomes $e_0+k$. Compare the current number of erasure ($e_0+k$) with the threshold $\sigma_e$. If the number of erasure is not larger than $\sigma_e$, the new code sequence (with k more erasures) is sent to the Reed-Solomon decoder again. The whole erase-compare-decode process ends when a valid code word is returned from the standard Reed-Solomon error and erasure decoder or the number of erasure exceeds the threshold $\sigma_e$.

To further reduce the symbol error probability and improve the performance of the code sequence identifier 103, the invention may use more than one frame of code word symbols. Accordingly, a symbol and reliability update unit 112 may be added in the code sequence identifier 103 as shown in FIG. 1. A method of updating the hard decision symbol value and reliability measurement when more than 15 symbols are received as well as a decoding procedure using more than one frame will be discussed in the following.

Figure 4:
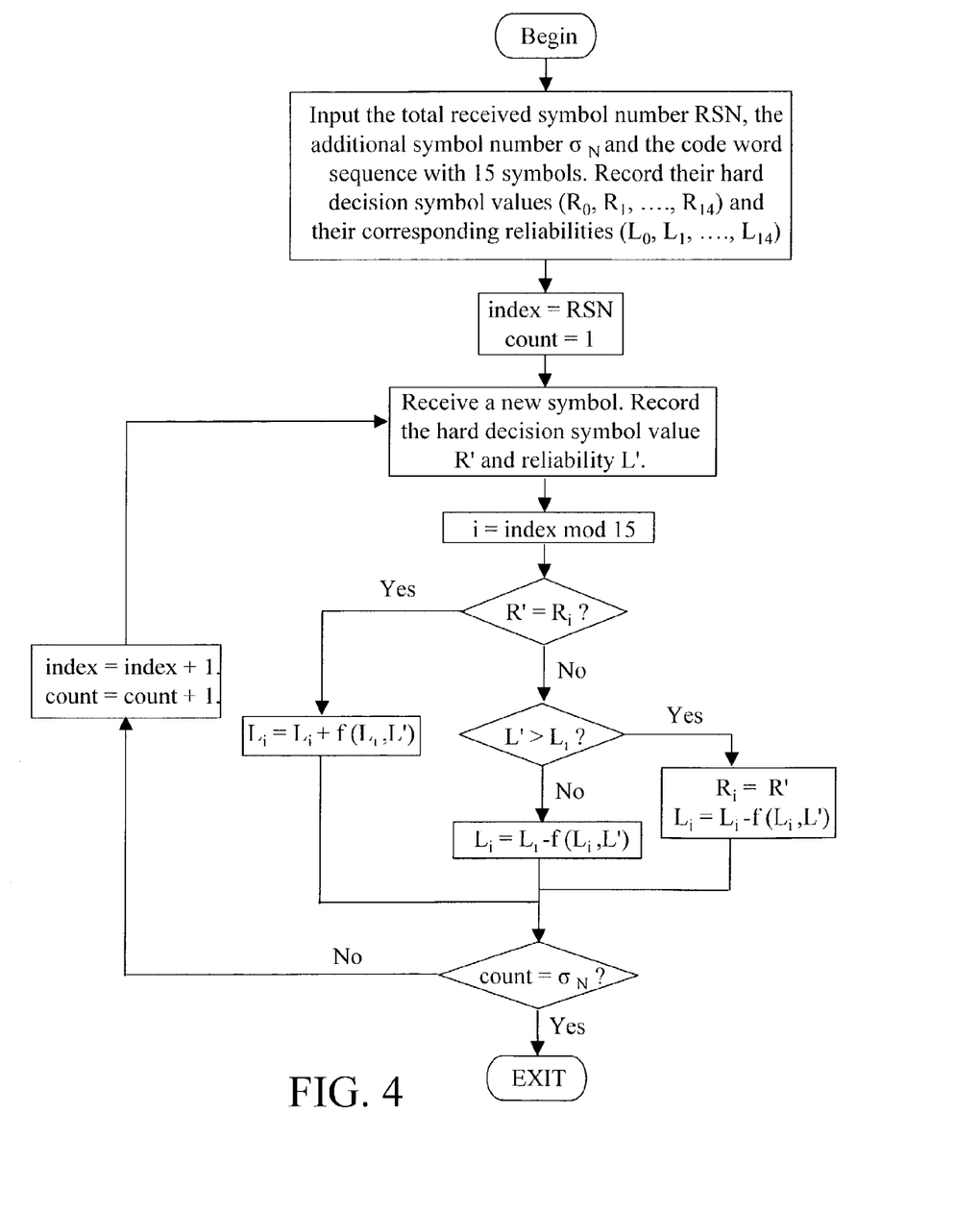
FIG. 4 illustrates the symbol and reliability update procedure.

Because the 15 code word symbols are cyclically transmitted, if a code sequence of 15 code word symbols fails to be decoded, it is not necessary to abandon this code sequence. In other words, new code word symbols can be received and used to update the hard-decision symbol values and the corresponding reliability measurements. FIG. 4 illustrates an embodiment of the method for updating the hard decision symbol value and reliability measurement.

Assume the previous received code word sequence of 15 code symbols is $(R_0, R_1, R_2, \ldots, R_{14})$ and the corresponding reliabilities is $(L_0, L_1, L_2, \ldots, L_{14})$. Since the 15 code word symbols are cyclically transmitted, ideally, $$R_i = R_{i \bmod 15} \; \forall i = 15, 16, 17, \ldots$$

After a frame of code word symbols is received, the total RSN is 15. When the 16th code word symbol is received, the hard-decision symbol value R' (or $R_{15}$) and the corresponding reliability L' (or $L_{15}$) are recorded. Ideally, R' should be equal to $R_0$. But in the presence of the noise or other reasons, the hard-decision symbol values $R_0$ and $R_{15}$ may not be equal. If the two hard-decision symbol values ($R_0$ and $R_{15}$) are equal, the reliability $L_0$ is updated by increasing the reliability for a certain amount. The amount of increased reliability is a function of the original reliability $L_0$ and the current received reliability $L_{15}$. For example, these two reliabilities can be added to represent the new reliability, $$L_{0(after\ updating)} = L_0 + L_{15}$$

However, if the two hard-decision symbol values ($R_0$ and $R_{15}$) are not equal, the symbol and the corresponding reliability have to be updated based on the result of comparing their corresponding reliabilities ($L_0$ and $L_{15}$). The hard-decision symbol value after updating is set to be the symbol value whose corresponding reliability is larger.

$$R_{0\ (after\ updating)} = \begin{cases} R_0, & \text{if } R_0 \neq R_{15} \text{ and } L_0 \geq L_{15} \\ R_{15}, & \text{if } R_0 \neq R_{15} \text{ and } L_0 < L_{15} \end{cases}$$

Also, the reliability after updating should be decreased. The amount of decreased reliability is also a function of $L_0$ and $L_{15}$. For example, $$L_{0(after\ updating)} = \max(L_0, L_{15}) - \min(L_0, L_{15})$$

By the same token, when the 17th code word symbol ($R_{16}$) is received (RSN equals to 16 now), ideally, $R_{16}$ should be equal to $R_1$. The hard-decision symbol value and reliability update procedure can again be applied to $R_1$ and $R_{16}$, and so on and so forth.

Figure 5:
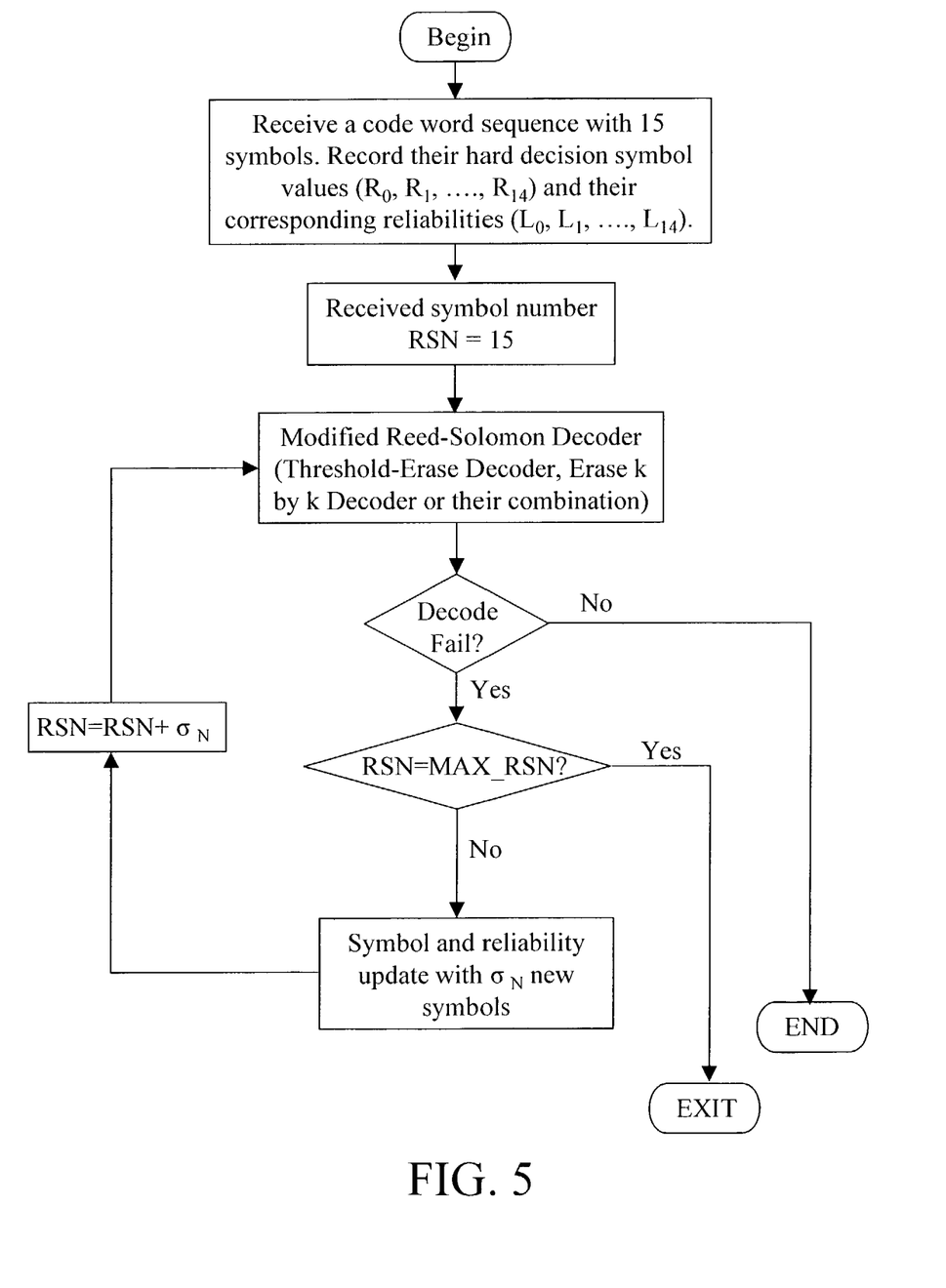
FIG. 5 illustrates a decoding procedure after receiving more than one frame.

With the method of updating the hard decision symbol value and reliability for $R_i$ and $R_{i\ mod\ 15}$, the decoding procedure can then be introduced. FIG. 5 shows a decoding strategy when more than one frame (15 symbols) are received. When the original code word sequence of 15 code word symbols $\underline{R} = (R_0, R_1, R_2, \ldots, R_{14})$ fails to be decoded, $\sigma_N$ new code word symbols may be received. For example, if $\sigma_N$ is equal to 4, 4 new code word symbols ($R_{15}, R_{16}, R_{17}, R_{18}$) are received. Applying the symbol value and reliability update procedure to $R_0$ and $R_{15}$, $R_1$ and $R_{16}$, $R_2$ and $R_{17}$, $R_3$ and $R_{18}$, a new code word sequence $\underline{R}'$ can be obtained. It is worth noting that even if the hard-decision symbol values may not be changed, the corresponding reliabilities may be different.

The new code word sequence $\underline{R}'$ and new reliability sequence $\underline{L}'$ are sent to the modified Reed-Solomon decoder. If the new code word sequence $\underline{R}'$ fails to be decoded again, another $\sigma_N$ new code word symbols may be received to obtain another new code word sequence $\underline{R}''$ and new reliability sequence $\underline{L}''$, wherein $\sigma_N$ can be any positive integer and can be changed for each update procedure. Again, $\underline{R}''$ and $\underline{L}''$ are sent to the modified Reed-Solomon decoder shown in FIG. 2 and FIG. 3 or the combination of them. The whole decoding procedure ends when the modified Reed-Solomon decoder returns a valid code word sequence. To avoid an endless loop due to a low signal-to-noise ratio or other reasons, a limitation of total RSN is used to terminate the loop. When the total received symbol number exceeds a pre-determined integer value MAX_RSN, the current code sequence will be abandoned.

Figure 6:
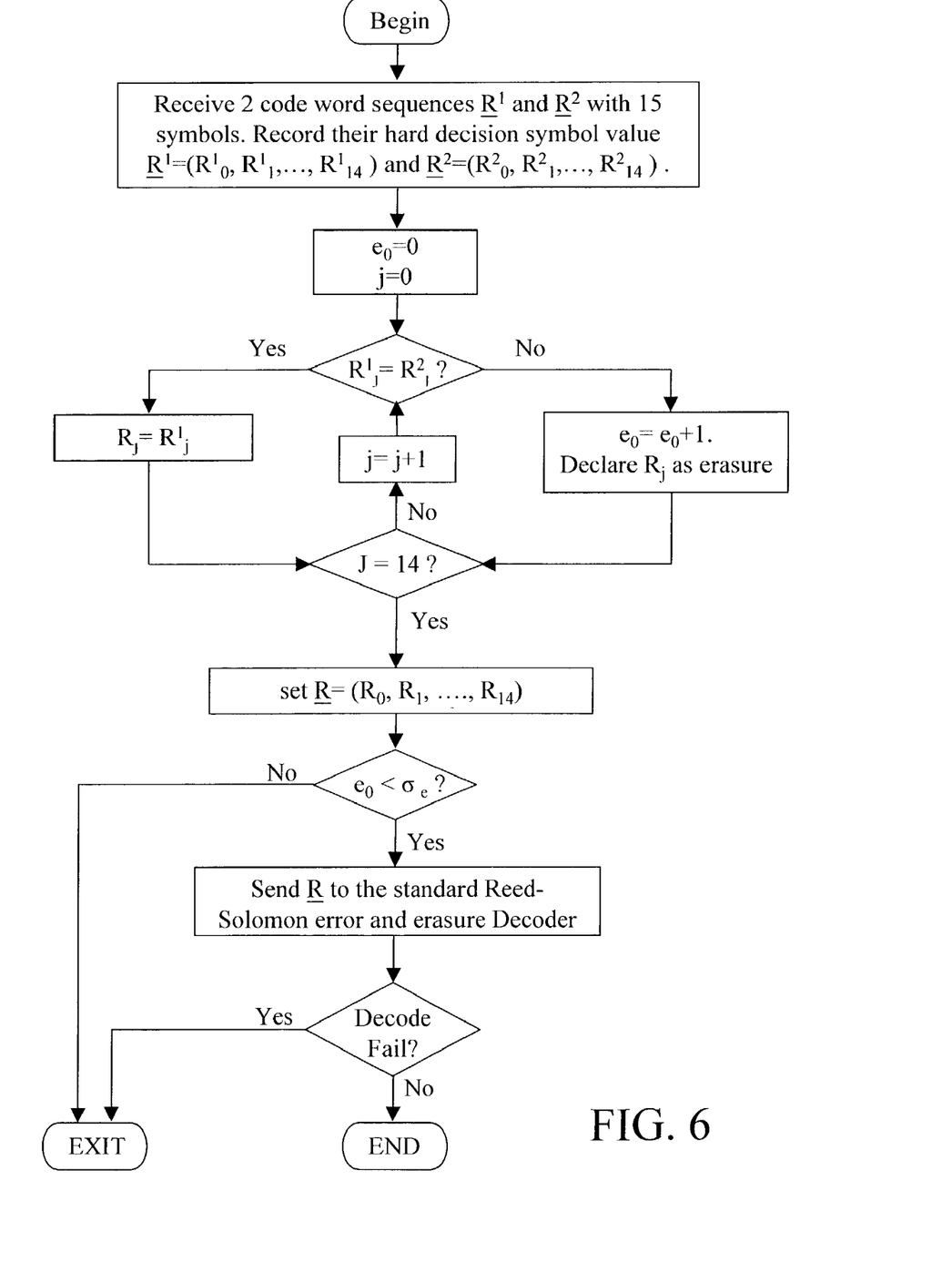
FIG. 6 illustrates a decoding strategy of multi frames with hard decision only.

FIG. 6 shows another decoding strategy for more than one code word sequence with hard decision only. Two code word sequences $\underline{R}^1$ and $\underline{R}^2$ are received first. Their hard-decision symbol values are $\underline{R}^1 = (R^1_0, R^1_1, R^1_2, \ldots, R^1_{14})$ and $\underline{R}^2 = (R^2_0, R^2_1, R^2_2, \ldots, R^2_{14})$ respectively. Compare $R^1_j$ and $R^2_j$ for j=0, 1, 2, \ldots, 14. If the hard-decision symbol values ($R^1_j$ and $R^2_j$) are not the same, $R_j$ is declared as erasure. After comparing 15 symbols in $\underline{R}^1$ and $\underline{R}^2$, if the total number of erasures $e_0$ being declared erasure is smaller than threshold $\sigma_e$, which can be any integers from 1 to 13, the code word sequence $\underline{R} = (R_0, R_1, R_2, \ldots, R_{14})$ with $e_0$ erasures is sent to the standard Reed-Solomon error and erasure decoder.

If the code sequence $\underline{R}$ fails to be decoded, these two code word sequences may simply be discarded or other decoding strategies may be tried. On the other hand, another code word sequence $\underline{R}^3$ with 15 code word symbols may continue to be received. By comparing $\underline{R}^3$ to the previous recorded code word sequence R, a new resulting code word sequence can be recorded in $\underline{R}'$ using the procedure described above. If the total number of erasures $e_0$ being declared in $\underline{R}'$ is smaller than the threshold $\sigma_e$, which may be decreased, the code word sequence $\underline{R}'$ with $e_0$ erasures is sent to the standard Reed-Solomon error and erasure decoder. The whole procedure ends when the standard Reed-Solomon error and erasure decoder returns a valid code word or the number of received code word sequence is equal to a maximum number of code word sequences allowed.

Figure 7:
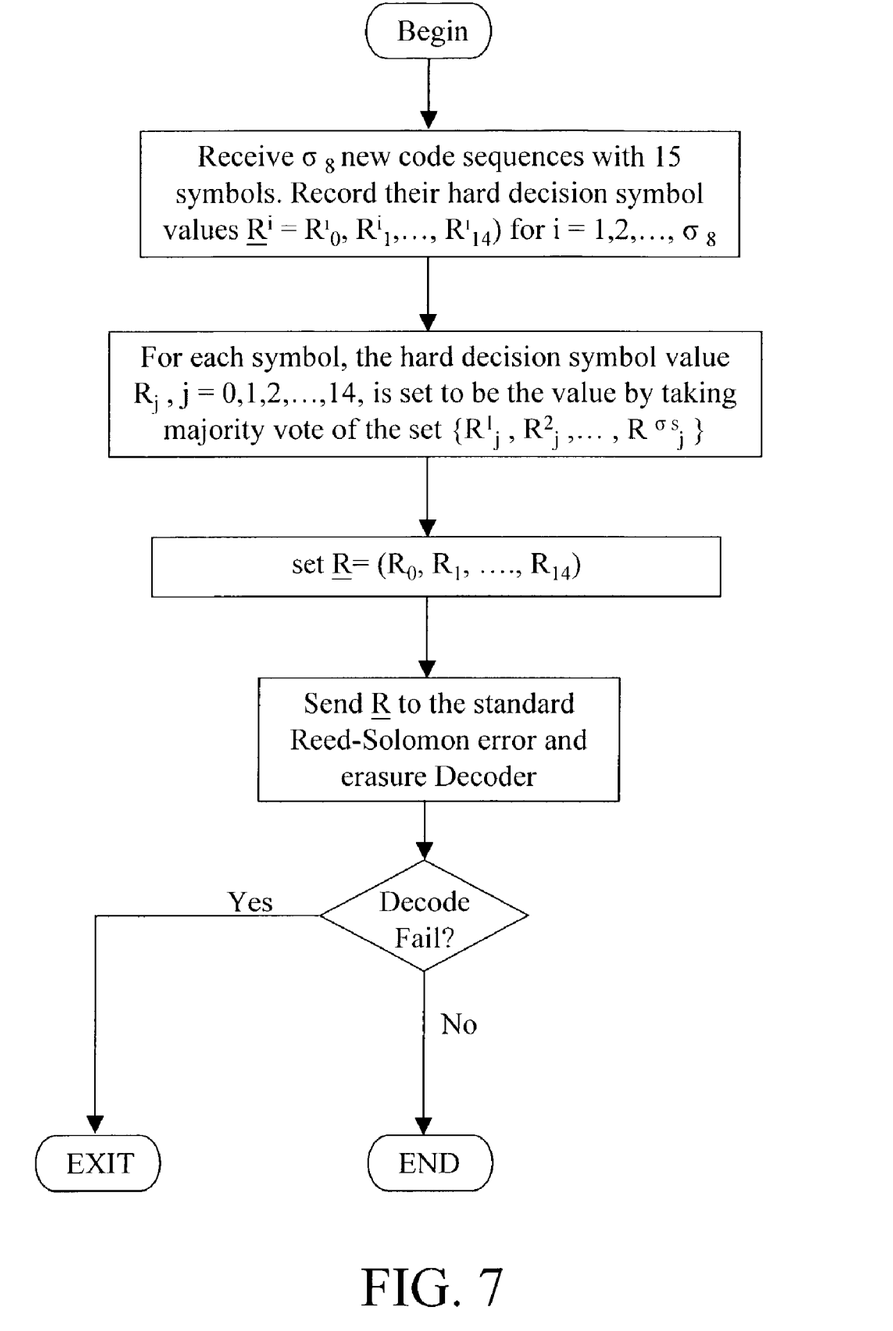
FIG. 7 illustrates a decoding strategy of multi frames with voting.

FIG. 7 shows an alternative decoding strategy using hard decision with voting. At the beginning, $\sigma_s$ code word sequences are received and their hard-decision symbol values $\underline{R}^1 = (R^1_0, R^1_1, R^1_2, \ldots, R^1_{14})$, $\underline{R}^2 = (R^2_0, R^2_1, R^2_2, \ldots, R^2_{14})$, $\ldots$, $\underline{R}^{\sigma_s} = (R^{\sigma_s}_0, R^{\sigma_s}_1, R^{\sigma_s}_2, \ldots, R^{\sigma_s}_{14})$ are recorded. For each code word symbol, the hard-decision symbol value $R_j$, j=0, 1, 2, \ldots, 14, is set to be the value by taking the majority vote of the set $\{R^1_j, R^2_j, R^3_j, \ldots, R^{\sigma_s}_j\}$. The resulting code word sequence is recorded in $\underline{R} = (R_0, R_1, R_2, \ldots, R_{14})$ and sent to the standard Reed-Solomon error and erasure decoder. If the decoding process fails, a new code word sequence may be received, and the majority vote is taken and then, the resulting code word sequence is decoded again. The whole decoding strategy ends when the standard Reed-Solomon error and erasure decoder returns a valid code word or the number of received code word sequences equals the maximum number of code word sequence allowed.

Figure 8:
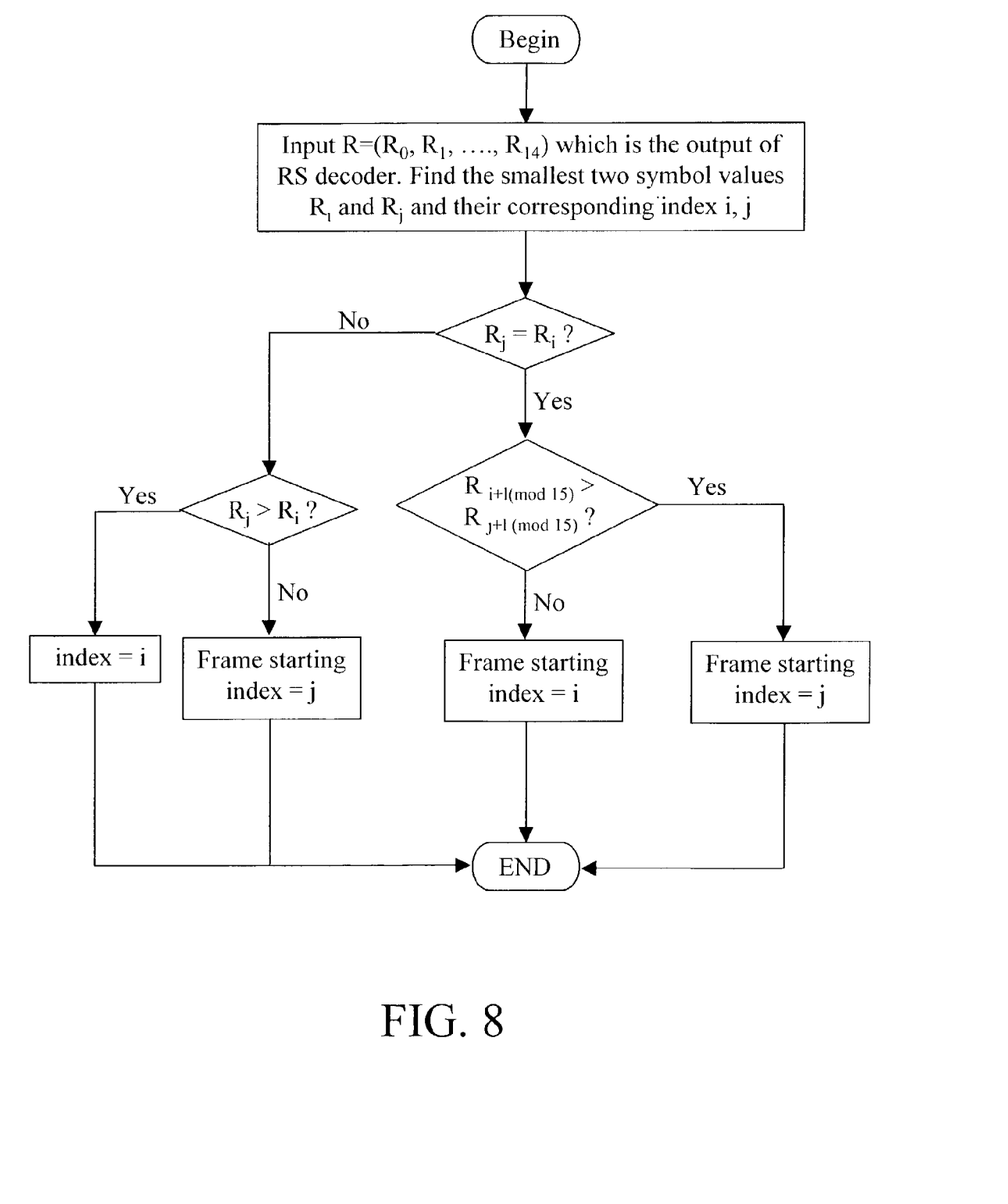
FIG. 8 illustrates the frame boundary finder.

As shown in FIG. 1, after the correct code sequence has been identified by the code sequence identifier 103, the frame boundary of the code sequence is determined by the frame boundary finder 104. FIG. 8 illustrates the method to finding the frame boundary after the Reed-Solomon decoder returns a valid code word sequence.

With reference to Table 1, it can be observed that the 64 code word sequences from the 64 groups are valid code words of comma-free Reed-Solomon codes, i.e., all code words do not have internal repetition. In addition, in each code word sequence of 15 code word symbols, the first code word symbol has the smallest symbol value, and the smallest symbol value is found at most twice in this code word sequence. If the smallest symbol value is unique, this symbol is the head of the frame. If the smallest symbol value is found twice, then the neighboring symbol after the head of the frame must have a smaller value than the neighboring symbol after the smallest symbol found in the other slot. For example, if the smallest symbol is found at slot number=0 and slot number=j, the symbol at the slot number=1 must have a smaller symbol value than the symbol at slot number=j+1.

As an example, the code word in Group 0 is (1, 1, 2, 8, 9, 10, 15, 8, 10, 16, 2, 7, 15, 7, 16) in which the smallest symbol value is 1. The smallest symbol value is found twice in slot number=0 and slot number=1. Comparing the two symbol values of the next symbols, i.e., slot number=1 and slot number=2, the symbol after the head of the frame, i.e., slot number=1, has a smaller symbol value. Take another example, the code word in Group 63 is (9, 12, 10, 15, 13, 14, 9, 14, 15, 11, 11, 13, 12, 16, 10) in which the smallest symbol value is 9. The smallest symbol value is found twice in slot number=0 and slot number=6. Comparing the two symbol values of the next symbols, i.e., slot number=1 and slot number=7, the symbol after the head of the frame, i.e., slot number=1 has a smaller symbol value.

As discussed before, the valid code word sequence returned by the Reed-Solomon decoder may be a cyclic shift of the original code word sequence. The frame boundary can be determined by finding the smallest two symbol values in the code word sequence. If the smallest two symbol values are not equal, the head index of frame boundary is the index of the smallest symbol value. If the smallest two symbol values are equal, the head index can be determined by comparing the two symbol values of the next symbols. Based on the property introduced above, it is easy to find the head index of the frame boundary.

Moreover, after the frame boundary has been determined, the apparatus of this invention identifies the code group using the code group identification unit 105. With reference to Table 1, it is observed that the code word sequence in each group can be uniquely identified by the first three code word symbols. By use of the property, only the first three columns of Table 1 have to be stored. By comparing the first three code word symbols, the code group number can be identified. Consequently, the memory requirement is much reduced in the code group identification unit of this invention.

It is worth mentioning that FIGS. 2 and 3 illustrate a "threshold-erase decoder" and an "erase k by k decoder" respectively for the modified Reed-Solomon decoder 111 of this invention. Variation of these decoders can be made for the modified Reed-Solomon decoder. For example, the "threshold-erase decoder" and "erase k by k decoder" can also be combined if desired.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method for code group identification and frame synchronization, comprising the steps of:
   (a) receiving a sequence of code word symbols;
   (b) generating at a code sequence identifier a valid code word from said sequence of code word symbols, said valid code word having a plurality of code word symbols each having an index in order;
   (c) determining at a frame boundary finder a frame boundary of said valid code word by finding a code head index in said valid code word corrected;
   (d) forming a code word sequence which is a cyclic shift of said valid code word starting with a code word symbol having said code head index; and
   (e) identifying at a code group identification unit a code group associated with said code word sequence.

2. The method for code group identification and frame synchronization as claimed in claim 1, wherein said step (b) further comprises the steps of:
   (b1) forming a sequence of hard decision symbols from said sequence of code word symbols, each hard decision symbol having a corresponding reliability; and
   (b2) generating said valid code word using a modified Reed-Solomon decoder based on said sequence of hard decision symbols and corresponding reliabilities.

3. The method for code group identification and frame synchronization as claimed in claim 2, wherein a received code word symbol is correlated with a plurality of code words to form a plurality of correlations, a hard decision symbol of said received code word symbol is determined based on said plurality of correlations, and a corresponding reliability is computed based on said plurality of correlations.

4. The method for code group identification and frame synchronization as claimed in claim 3, wherein a code word having a highest correlation among said plurality of correlations with a received code word symbol is selected as a hard decision symbol and a corresponding reliability is the height correlation.

5. The method for code group identification and frame synchronization as claimed in claim 2, wherein said step (b2) further comprises the steps of:
   (i) receiving a new symbol from said sequence of hard decision symbols;
   (ii) declaring said new symbol as a valid symbol if the corresponding reliability of said new symbol is greater than a reliability threshold, or as an invalid symbol otherwise;
   (iii) recording total number of valid symbols;
   (iv) sending a code sequence based on valid symbols to a Reed-Solomon error-and-erasure decoder if said recorded total number of valid symbols is greater than or equal to a threshold of total number of valid symbols, or going to step (vi) otherwise;

(v) generating said valid code word and ending said step (b2) if said Reed-Solomon error-and-erasure decoder returns successfully;

(vi) ending said step (b2) if all symbols of said sequence of hard decision symbols have been received, or returning to step (i) otherwise.

6. The method for code group identification and frame synchronization as claimed in claim 5, wherein said sequence of hard decision symbols has at most 15 hard decision symbols, and said threshold of total number of valid symbols is an integer number between 3 and 15 and is a function of the number of hard decision symbols received.

7. The method for code group identification and frame synchronization as claimed in claim 2, wherein said step (b2) further comprises the steps of:

(i) receiving a sequence of hard decision symbols including valid symbols and invalid symbols;

(ii) sending a code sequence based on valid symbols to a Reed-Solomon error-and-erasure decoder if total number of invalid symbols in said sequence of hard decision symbols is not greater than a threshold of total number of invalid symbols, or ending said step (b2) otherwise;

(iii) generating said valid code word and ending said step (b2) if said Reed-Solomon error-and-erasure decoder returns successfully;

(iv) selecting k symbols from current valid symbols of said sequence of hard decision symbols, said k symbols having lowest k reliabilities among all current valid symbols of said sequence of hard decision symbols, wherein k is an integer number;

(v) declaring said k symbols invalid and determining total number of invalid symbols from said sequence of hard decision symbols;

(vi) returning to step (ii) if total number of invalid symbols in said sequence of hard decision symbols is not greater than said threshold of total number of invalid symbols, or ending said step (b2) otherwise.

8. The method for code group identification and frame synchronization as claimed in claim 7, wherein said sequence of hard decision symbols has 15 hard decision symbols, and said threshold of total number of invalid symbols is an integer number between 0 and 12.

9. The method for code group identification and frame synchronization as claimed in claim 1, wherein said step (c) comprises the steps of:

(c1) finding two code word symbols with smallest symbol values in said valid code word, said two code word symbols having indexes I and J respectively, wherein I and J are integer numbers;

(c2) setting said code head index to I for completion of said step (c) if the code word symbol with index I has a value smaller than the code word symbol with index J, or setting said code head index to J for completion of said step (c) if the code word symbol with index J has a value smaller than the code word symbol with index I, or continuing step (c3) if the code word symbol with index I is identical to the code word symbol with index J;

(c3) identifying two code word symbols with indexes I1 and J1 and going to (c4) if the code word symbol with index I has a value equal to the code word symbol with index J, I1 being the remainder of I+1 divided by n, J1 being the remainder of J+1 divided by n and n being the number of code word symbols in said valid code word, wherein I1 and J1 are integer numbers; and (c4) setting said code head index to I if the code word symbol with index I1 has a value smaller than the code word symbol with index J1, or setting said code head index to J otherwise.

10. The method for code group identification and frame synchronization as claimed in claim 1, wherein said step (e) includes a matching method using only first three code word symbols to determine a code group associated with said code word sequence.

11. An apparatus for code group identification and frame synchronization, comprising:

a plurality of correlators receiving code word symbols and generating a plurality of correlations;

a hard decision and reliability measurement unit receiving said plurality of correlations and generating a sequence of hard decision symbols each having a corresponding reliability;

a code sequence identifier receiving said sequence of hard decision symbols and corresponding reliabilities, and generating a valid code word; a frame boundary finder receiving said valid code word, cyclic shifting and determining a code word sequence; and a code group identification unit receiving said code word sequence and determining a code group of said code word sequence.

12. The apparatus for code group identification and frame synchronization as claimed in claim 11, wherein said code sequence identifier comprises a modified Reed-Solomon decoder for decoding said sequence of hard decision symbols.

13. The apparatus for code group identification and frame synchronization as claimed in claim 12, wherein said code sequence identifier further comprises a symbol and reliability update unit for updating code word symbols and the corresponding reliabilities generated by said hard decision and reliability measurement unit for the code word symbols being updated.

* * * * *